(12) United States Patent
Chang et al.

(10) Patent No.: US 10,366,540 B2
(45) Date of Patent: Jul. 30, 2019

(54) ELECTRONIC APPARATUS AND METHOD FOR VIRTUAL REALITY OR AUGMENTED REALITY SYSTEM

(71) Applicant: HTC Corporation, Taoyuan (TW)

(72) Inventors: Edward Chang, Taoyuan (TW);
Liang-Kang Huang, Taoyuan (TW);
Chih-Yang Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 100 days.

(21) Appl. No.: 15/468,096

(22) Filed: Mar. 23, 2017

(65) Prior Publication Data

US 2018/0276894 A1   Sep. 27, 2018

(51) Int. Cl.
*G06T 19/00* (2011.01)
*G06F 3/01* (2006.01)
*G02B 27/01* (2006.01)

(52) U.S. Cl.
CPC ............ *G06T 19/006* (2013.01); *G06F 3/012* (2013.01); *G06F 3/013* (2013.01); *G06F 3/017* (2013.01); *G02B 27/017* (2013.01); *G02B 2027/0138* (2013.01)

(58) Field of Classification Search
None
See application file for complete search history.

(56) References Cited

U.S. PATENT DOCUMENTS

| 9,143,880 B2 * | 9/2015 | Vennstrom | G06F 3/167 |
| 9,495,589 B2 * | 11/2016 | Strombom | A61B 3/113 |
| 2011/0172931 A1 * | 7/2011 | Murthy | G06F 19/703 702/32 |
| 2014/0247210 A1 * | 9/2014 | Henderek | G06F 3/02 345/156 |
| 2015/0199849 A1 | 7/2015 | Cho et al. | |

(Continued)

FOREIGN PATENT DOCUMENTS

| CN | 102239505 A | 11/2011 |
| CN | 104641318 A | 5/2015 |

(Continued)

OTHER PUBLICATIONS

Corresponding Taiwan office action dated Nov. 27, 2018.

*Primary Examiner* — Motilewa Good Johnson
(74) *Attorney, Agent, or Firm* — CKC & Partners Co., LLC

(57) ABSTRACT

An electronic apparatus includes a displayer, a graphic processing circuit, sensors and a control circuit. The displayer is configured for displaying a virtual reality scene or an augmented reality scene. The graphic processing circuit is coupled to the displayer. The graphic processing circuit is configured for computing a plurality of scene segments in the virtual reality scene or the augmented reality scene. The sensors are configured for collecting attention factors. The control circuit is coupled to the sensors and the graphic processing circuit. The control circuit is adapted to generate an attention map according to the attention factors. The attention map indicates priority rankings of the scene segments. The control circuit is further adapted to allocate a distribution of computational resources of the graphic processing circuit between the scene segments according to the priority rankings. The scene segments are computed differentially according to the distribution of computational resources.

22 Claims, 8 Drawing Sheets

(56) References Cited

U.S. PATENT DOCUMENTS

| | | | |
|---|---|---|---|
| 2017/0045941 A1* | 2/2017 | Tokubo | G06F 3/167 |
| 2017/0205892 A1* | 7/2017 | Petrovskaya | G06T 19/006 |
| 2018/0129469 A1* | 5/2018 | Vennstrom | G06F 3/013 |

FOREIGN PATENT DOCUMENTS

| | | |
|---|---|---|
| CN | 106296828 A | 1/2017 |
| CN | 106354251 A | 1/2017 |
| TW | 201546657 A | 12/2015 |
| TW | 201610472 A | 3/2016 |
| TW | 201633104 A | 9/2016 |
| TW | 201640280 A | 11/2016 |

* cited by examiner

ELECTRONIC APPARATUS AND METHOD FOR VIRTUAL REALITY OR AUGMENTED REALITY SYSTEM

BACKGROUND

Field of Invention

The present application relates to a virtual reality or augmented reality system. More particularly, the present application relates to a management of computational resources on the virtual reality or augmented reality system.

Description of Related Art

In virtual reality (VR) and augmented reality (AR) systems, latency between a head movement and a corresponding screen update on a head-mounted display (HMD) is one of the most critical factors in providing an immersive experience of a VR or AR scene. If the latency is relative severe (e.g., over 20 milliseconds), the user wearing the head-mounted display may experience dizzy due to jitters on the screen or confused by the belated update on the screen after the actual head movement.

In order to prevent jitters on the screen and avoid dizziness of the user, a VR/AR system must render content within a bounded latency, which is typically less than 20 milliseconds.

SUMMARY

The disclosure provides an electronic apparatus, which includes a displayer, a graphic processing circuit, sensors and a control circuit. The displayer is configured for displaying a virtual reality scene or an augmented reality scene. The graphic processing circuit is coupled to the displayer. The graphic processing circuit is configured for computing a plurality of scene segments in the virtual reality scene or the augmented reality scene. The sensors are configured for collecting attention factors. The control circuit is coupled to the sensors and the graphic processing circuit. The control circuit is adapted to generate an attention map according to the attention factors. The attention map indicates priority rankings of the scene segments. The control circuit is further adapted to allocate a distribution of computational resources of the graphic processing circuit between the scene segments according to the priority rankings. The scene segments are computed differentially according to the distribution of computational resources.

The disclosure provides a method for displaying a virtual reality scene or an augmented reality scene. The method includes following operations. Attention factors are collected. An attention map is generated according to the attention factors. The attention map indicates priority rankings of scene segments in the virtual reality scene or the augmented reality scene. A distribution of computational resources between the scene segments is allocated according to the priority rankings of the scene segments in the attention map. The scene segments are computed differentially according to the distribution of computational resources.

The disclosure provides a non-transitory computer readable storage medium with a computer program to execute a method. The method includes following operations. Attention factors are collected. An attention map is generated according to the attention factors. The attention map indicates priority rankings of scene segments in the virtual reality scene or the augmented reality scene. A distribution of computational resources between the scene segments is allocated according to the priority rankings of the scene segments in the attention map. The scene segments are computed differentially according to the distribution of computational resources.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
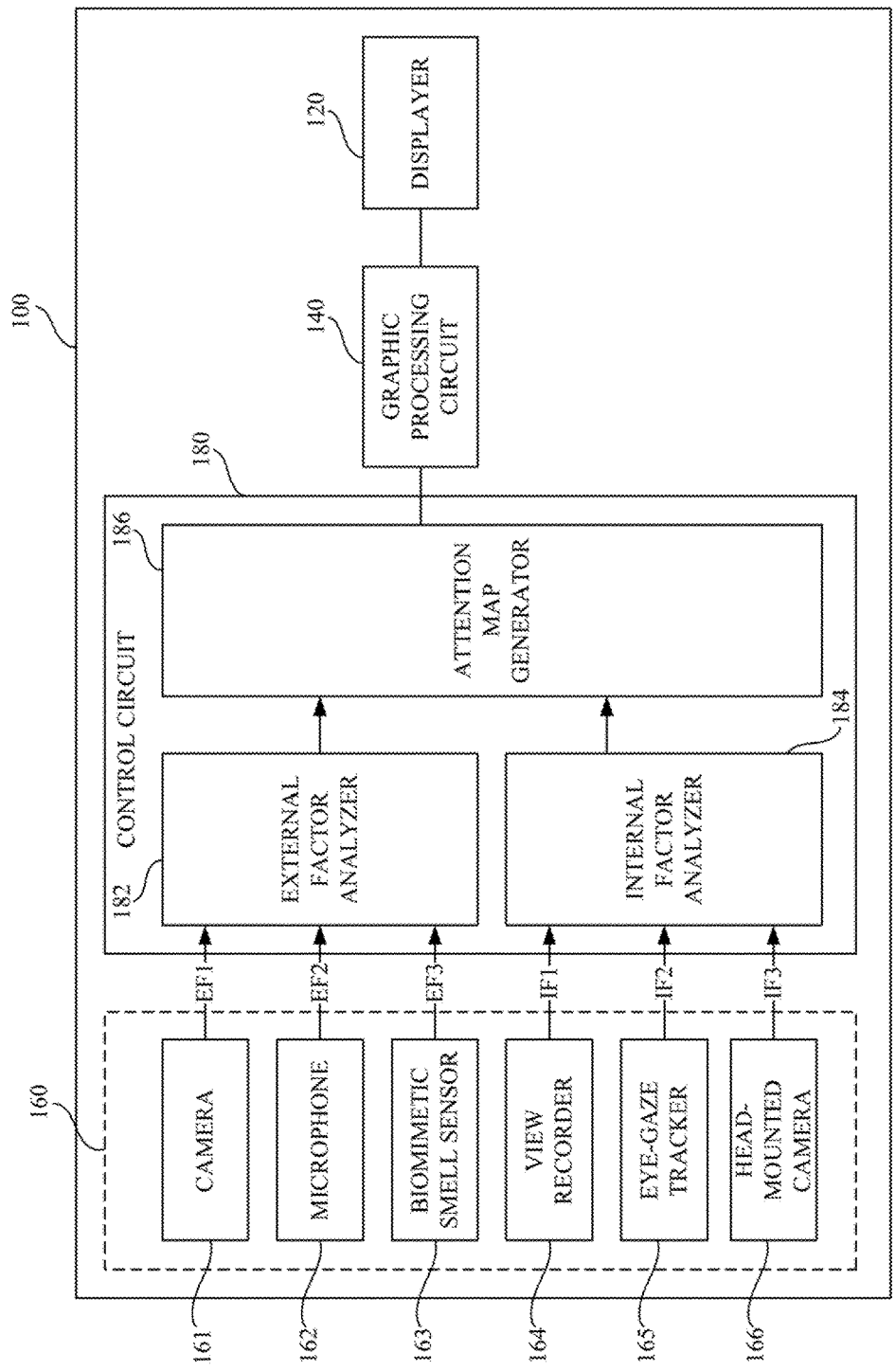
FIG. 1 is a schematic diagram illustrating an electronic apparatus according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an electronic apparatus 100 according to an embodiment of this disclosure. As shown in FIG. 1, the electronic apparatus 100 includes a displayer 120, a graphic processing circuit 140, sensors 160 and a control circuit 180. In some embodiment, the electronic apparatus 100 can be a device of a virtual reality (VR) system or an augmented reality (AR) system. The displayer 120 can be a head-mounted display (HMD), which is disposed on the electronic apparatus 100. When a user wears the electronic apparatus 100, the displayer 120 will cover visions of the user, and the displayer 120 is configured for displaying a virtual reality scene or an augmented reality scene to the user.

The graphic processing circuit 140 is coupled to the displayer 120. The graphic processing circuit 140 is configured to process image/video data of the VR (or AR) scene to be displayed on the displayer 120. The VR/AR scene may include several scene segments, such as items (e.g., clocks, doors, tables, chairs, products, etc.), objects (people, animals, bicycles, etc.) and/or background features (walls, clouds, shadows, weather, traffics, etc.).

When the electronic apparatus 100 is displaying the VR scene, the scene segments are created from predefined VR models. The graphic processing circuit 140 performs computations for rendering the scene segments and combining these scene segments together to form the VR scene.

When the electronic apparatus 100 is displaying the AR scene, the scene segments may include real objects existed in the surrounding environment around the electronic apparatus 100 and/or real segments created from predefined VR models. The graphic processing circuit 140 performs computations for recognizing the real objects, reconstructing scene models corresponding to the real objects, rendering the scene segments (including real scene models and predefined VR models) and combining these scene segments together to form the VR scene.

In order to display the VR or AR scene at a high quality (e.g., high resolutions, high color depths, and/or high refresh rates) require a lot of computational resources of the graphic processing circuit 140 to render, recognize, reconstruct the scene segments in the VR or AR scene. On the other hand, in order to prevent jitters on the screen and avoid dizziness of the user, the graphic processing circuit 140 must complete the computations within a bounded latency at each time that the displayer 120 refreshes displaying data. For example, the graphic processing circuit 140 may have a refresh rate at 90 frames-per-second (fps).

Since the computational resources of the graphic processing circuit 140 are limited, it is hard to complete the computations of all of the scene segments at the high quality and also meet the requirement of the bounded latency. In an embodiment, the electronic apparatus 100 provides an attention-based scheme to optimize the computational resources of the graphic processing circuit 140.

The sensors 160 are configured for collecting attention factors. The control circuit 180 is coupled to the sensors 160 and the graphic processing circuit 140. The control circuit 180 is adapted to generate an attention map according to the attention factors collected by the sensors 160. The attention map indicates priority rankings of the scene segments. The control circuit 180 is further adapted to allocate a distribution of computational resources of the graphic processing circuit 140 between the scene segments according to the priority rankings. The scene segments are computed differentially by the graphic processing circuit 140 according to the distribution of computational resources. Further details of the attention factors and the attention map are disclosed in following paragraphs.

Figure 2:
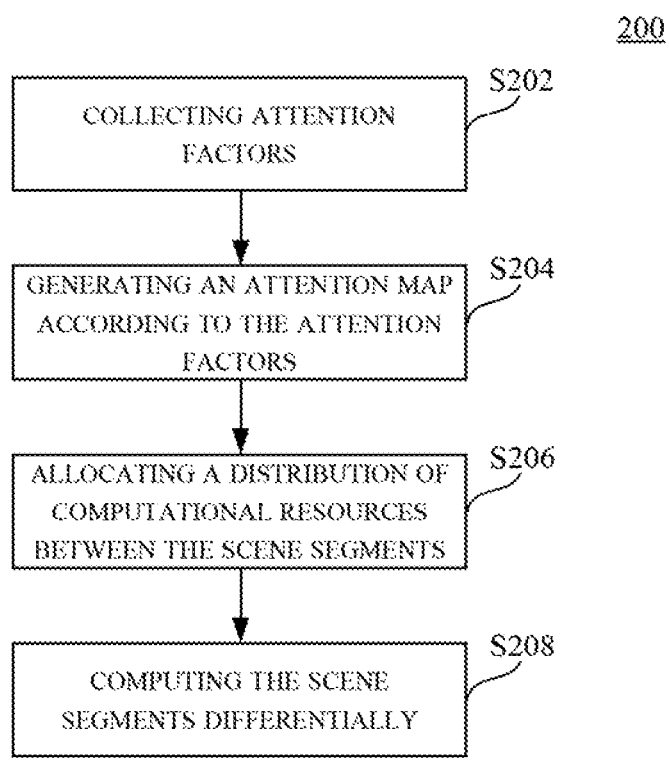
FIG. 2 is a flow chart illustrating a method according to an embodiment of the disclosure.
Figure 3A:
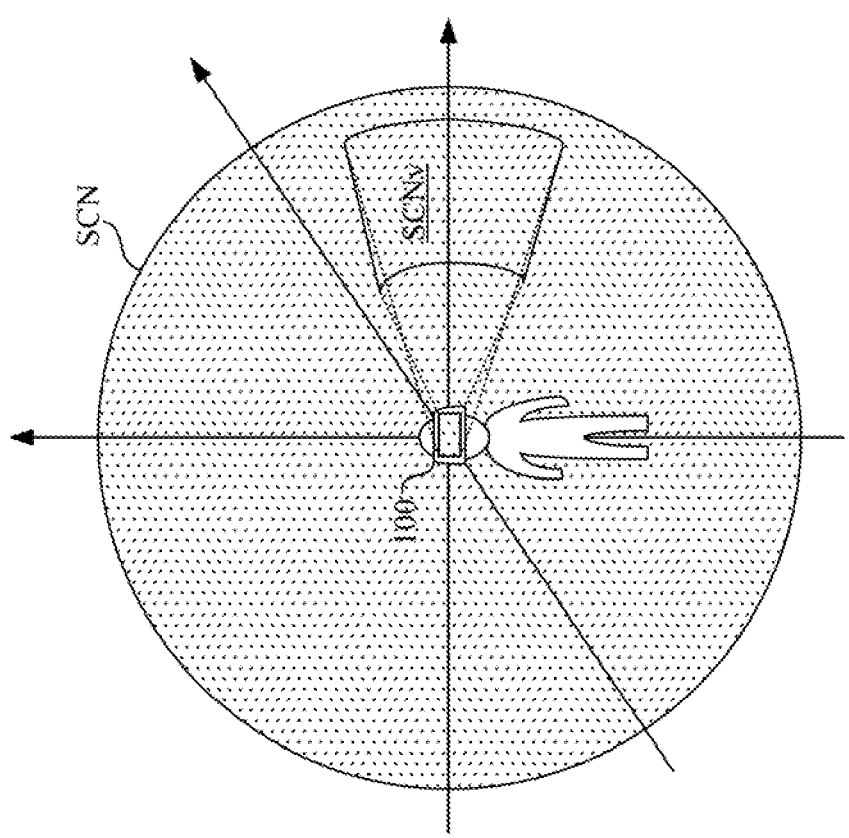
FIG. 3A is a schematic diagram illustrating a VR/AR scene according to an embodiment.

Reference is also made to FIG. 2. FIG. 2 is a flow chart illustrating a method 200 according to an embodiment of the disclosure. The method 200 is suitable to be performed on the electronic apparatus 100 shown in FIG. 1, for displaying a VR/AR scene. Reference is also made to FIG. 3A, which is a schematic diagram illustrating a VR/AR scene SCN according to an embodiment. As an embodiment shown in FIG. 3A, the VR/AR scene SCN can include image data with a sphere shaped VR/AR scenario surrounding the user wearing the electronic apparatus 100. The disclosed is not limited to the sphere shaped VR/AR scenario. In another embodiment, the VR/AR scene SCN can include image data with a hemisphere shaped VR/AR scenario, a circular ring shaped VR/AR scenario or other equivalent shapes.

Figure 3B:
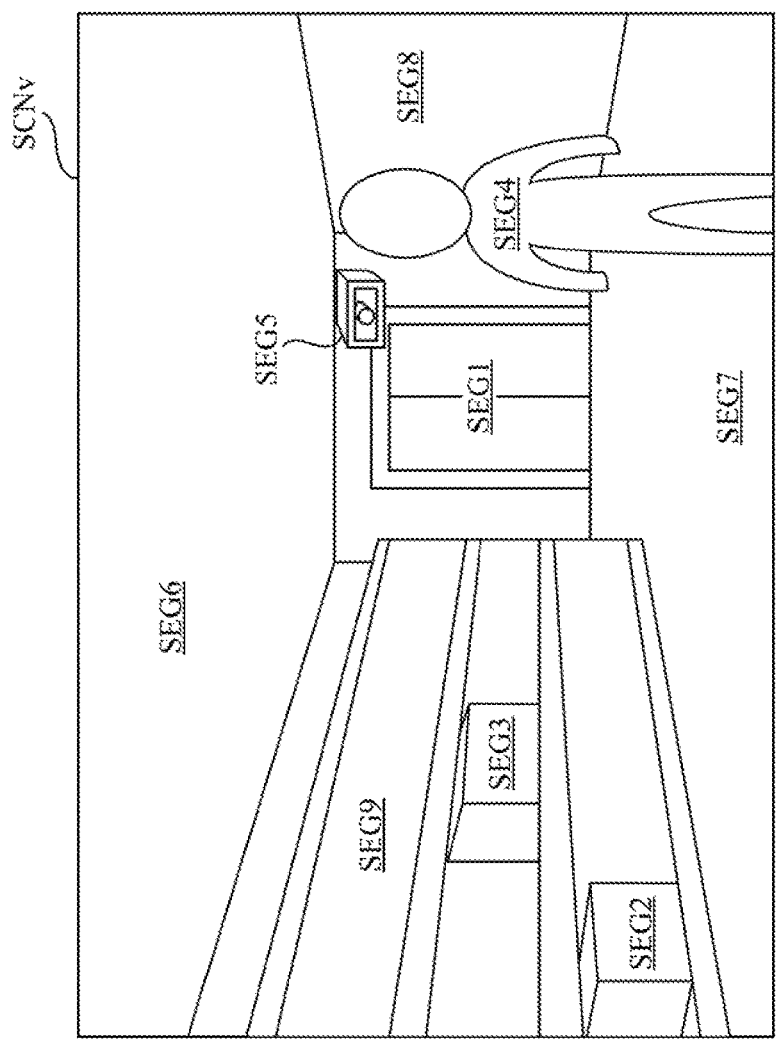
FIG. 3B is a schematic diagram illustrating an embodiment of the visible portion of the VR/AR scene in FIG. 3A.

Because a visible field of human visions has a limitation, the user is not able to see the whole VR/AR scene SCN, and the displayer 120 in this embodiment is configured to display a visible portion SCNv within the VR/AR scene SCN. In an embodiment, the electronic apparatus 100 include a motion sensor (not shown in figures) for detecting a movement of the user. The visible portion SCNv is dynamically shifted according to the movement of the user. For example, the visible portion SCNv will be moved upward when the user raises his/her head. Similarly, when the user rotates his/her head or body to the right side, the visible portion SCNv will be moved to the right correspondingly. Reference is further made to FIG. 3B, which is a schematic diagram illustrating an embodiment of the visible portion SCNv of the VR/AR scene SCN in FIG. 3A.

As shown in FIG. 1 and FIG. 2, the method 200 performs operation S202 to collect attention factors by the sensors 160. In the embodiment shown in FIG. 1, the sensors 160 include a camera 161, a microphone 162, a biomimetic smell sensor 163, a view recorder 164, an eye-gaze tracker 165 and a head-mounted camera 166. However, the sensors 160 of the disclosure are not limited to include all of these sensors shown in FIG. 1. In another embodiment, the sensors 160 can be a combination including at least one of the camera 161, the microphone 162 and the biomimetic smell sensor 163, and at least one of the view recorder 164, the eye-gaze tracker 165 and the head-mounted camera 166. For example, the sensors 160 may include the camera 161, the microphone 162, the view recorder 164 and the eye-gaze tracker 165.

As the embodiment shown in FIG. 3B, the visible portion SCNv includes scene segments SEG1-SEG9 for illustration. The scene segments SEG1-SEG9 are items, objects, or background features in the visible portion SCNv. For example, the scene segment SEG1 is an automatic door located in the front of the user. The scene segments SEG2 and SEG3 are products placed at different positions on a display shelf (the scene segment SEG9). The scene segment SEG4 is a person. The scene segment SEG5 is a speaker. The scene segments SEG6-SEG8 are background features in the visible portion SCNv of the VR/AR scene SCN. In this case, the scene segment SEG6 is the ceiling, the scene segment SEG7 is the floor, and the scene segment SEG8 is a side wall.

The attention factors can include at least one external factor and at least one internal factor. The at least one external factor is related to a variance of the scene segments in the VR/AR scene. The internal factor is related to a gesture or a movement of a user of the electronic apparatus 100.

As shown in FIG. 1 and FIG. 3B, the camera 161 is configured for capturing a motion or an appearance of a real object (e.g., the person SEG4, a cat, a vehicle, products SEG2 or SEG3, etc.) around the electronic apparatus 100. The attention factors EF1 collected by the camera 161 can include the motion (e.g., moving pattern or moving speed of the scene segments SEG1-SEG4) or the appearance (e.g., shape, texture or color of the scene segments SEG1-SEG9) of the real object.

In an embodiment, the camera 161 can be attached on the HMD headset of the electronic apparatus 100. In this case, the camera 161 and the head-mounted camera 166 can be implemented by one singular camera mounted on the HMD headset or two different cameras mounted on different places of the HMD headset.

In another embodiment, the camera 161 can be a stand-alone camera wired or wireless communicated with the control circuit 180. In this case, the camera 161 is independent from the HMD headset of the electronic apparatus 100.

The microphone 162 is configured for receiving a sound (e.g., a phone ring, a broadcasting message, a calling from another person, a voice, a barking sound from a dog, a music played by a speaker, etc.) around the electronic apparatus 100. In this case, the attention factors EF2 collected by the microphone 162 can include an origin (e.g., coordinates of a source of the sound relative to the electronic apparatus 100) or an orientation (e.g., a voice beaming angle of the sound relative to the electronic apparatus 100) of the sound.

The biomimetic smell sensor 163 is configured for sensing an odor around the electronic apparatus. In this case, the attention factors EF3 collected by the biomimetic smell sensor 163 can includes an origin (e.g., coordinates of a source of the odor relative to the electronic apparatus 100) or an orientation of the odor (e.g., an inward angle of the odor relative to the electronic apparatus 100).

The attention factors EF1, EF2 and EF3 are regarded as external factors related to a variance of the scene segments in the VR/AR scene.

The view recorder 164 is configured for recording a streaming view of the visible portion SCNv within the VR/AR scene SCN (referring to FIG. 3A). The streaming view captured by the view recorder 164 indicates a current view or a history about user-visible regions within the whole VR/AR scene SCN. The attention factor IF1 collected by the view recorder 164 includes a location of the visible portion SCNv. The location can be recorded as current coordinates of the visible portion SCNv or a moving pattern of the visible portion SCNv during a period of time.

The eye-gaze tracker 165 is configured for detecting an eye-gaze pattern of the user of the electronic apparatus 100. The attention factors IF2 collected by the eye-gaze tracker 165 can includes a gaze point (e.g., where the user looking at) or a gaze time period (e.g., how long the user's eye stays at each gaze point) in the eye-gaze pattern.

The head-mounted camera 166 is configured for capturing a view in front of the user of the electronic apparatus 100. The attention factors IF3 collected by the head-mounted camera 166 can include a real object appeared in the front view relative to the user or a camera pose (e.g., the head-mounted camera 166 is tilted or rotated) of the head-mounted camera 166.

The attention factors IF1, IF2 and IF3 are regarded as internal factors related to a vision, a gesture or a movement of a user of the electronic apparatus 100.

As shown in FIG. 1 and FIG. 2, the method 200 performs operation S204 to generate an attention map according to the attention factors. The attention map indicates priority rankings of scene segments SEG1-SEG9 in the visible portion SCNv of the VR/AR scene SCN. In an embodiment, the attention factors EF1, EF2 and EF3 are analyzed by the external factor analyzer 182 of the control circuit 180. The attention factors IF1, IF2 and IF3 are analyzed by the internal factor analyzer 184 of the control circuit 180. Analyzation results of the external factor analyzer 182 and the internal factor analyzer 184 are evaluated in combination by the attention map generator 186 to generate the attention map. The control circuit 180 can be a processor, a graphic processing unit or a processing integrated circuit. The external factor analyzer 182, the internal factor analyzer 184 and the attention map generator 186 can be software programs executed by the control circuit 180.

The attention map can be generated to indicate a current attention distribution of user's attention, or to indicate a potential attention prediction of user's attention.

The control circuit 180 determines the priority rankings of scene segments SEG1-SEG9 in the attention map based on the characteristics of the attention factors EF1-EF3 and IF1-IF3.

The attention factors EF1 includes appearances and motions of the scene segments SEG1-SEG9. If one of the scene segments SEG1-SEG9 are distinct in color, texture or patterns, the one of the scene segments SEG1-SEG9 may easily grab users' attention. The one of the scene segments SEG1-SEG9 will have a relative higher priority ranking. If one of the scene segments SEG1-SEG4 is moving in the visible portion SCNv of the VR/AR scene SCN (in the example shown in FIG. 3B, the scene segments SEG5-SEG9 are normally fixed), the moving one of the scene segments SEG1-SEG4 is likely to capture users' attention. The moving one of the scene segments SEG1-SEG4 will have a relative higher priority ranking.

Figure 4:
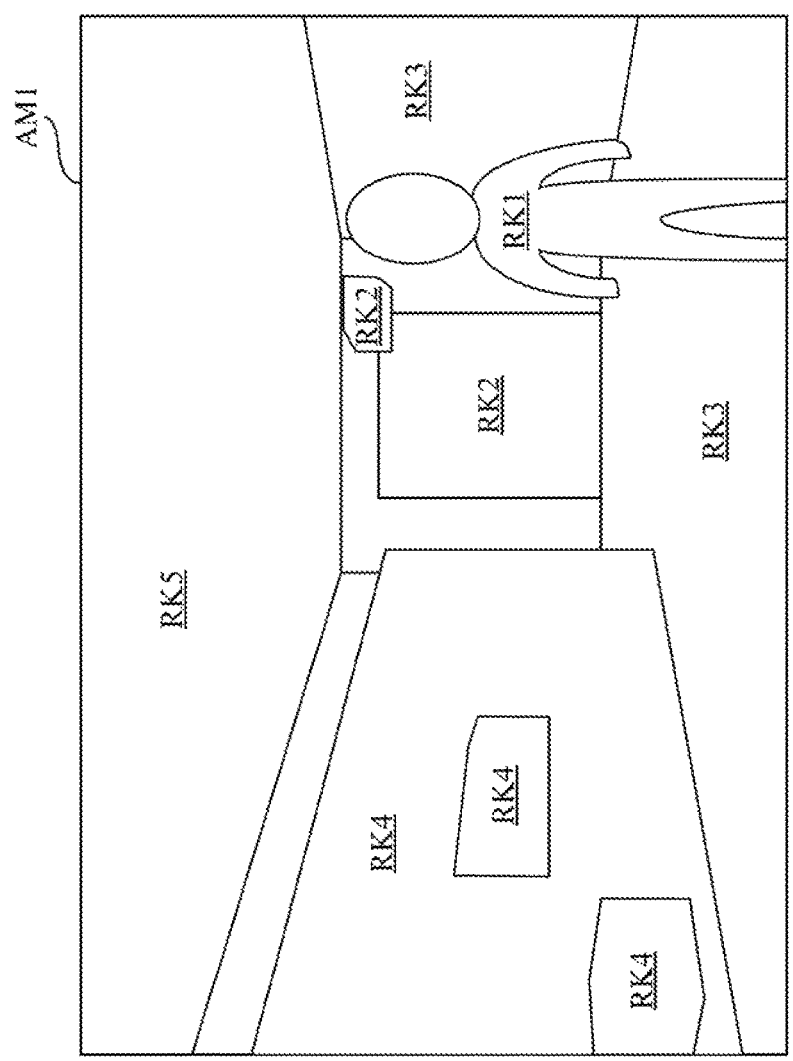
FIG. 4 is an example of an attention map generated from the attention factors.

Reference is also made to FIG. 4, which is an example of an attention map AM1 generated from the attention factors EF1-EF3 and IF1-IF3. In the example shown in FIG. 3B and FIG. 4, the person is moving (the scene segment SEG4 in FIG. 3B), such that a corresponding position in the attention map AM1 is marked as the first priority ranking RK1, which is the highest priority ranking. In this case, the scene segments SEG1 and SEG5 are located around the moving scene segment SEG4, such that corresponding positions in the attention map AM1 are marked as the second priority ranking RK2, which is second to the first priority ranking RK1. The scene segments SEG7 and SEG8 are background features around the moving scene segment SEG4, such that corresponding positions in the attention map AM1 are marked as the third priority ranking RK3. The scene segments SEG2, SEG3 and SEG9 are far from the moving scene segment SEG4, such that corresponding positions in the attention map AM1 are marked as the fourth priority ranking RK4. The scene segment SEG6 is a background feature far from the moving scene segment SEG4, such that a corresponding position in the attention map AM1 are marked as the fifth priority ranking RK5, which is the lowest priority ranking.

The attention map AM1 can be a two-dimensional attention map or three-dimensional attention map. In the two-dimensional attention map, a probability of drawing user attention is assigned to each pixel in the visible portion SCNv of the VR/AR scene SCN, or a probability of drawing user attention is assigned to each direction relative to the user. In the three-dimensional attention map, a probability of drawing user attention is assigned to each vertex in the visible portion SCNv, or a probability of drawing user attention is assigned to each object in the visible portion SCNv.

The attention factors EF2 includes an origin (e.g., the scene segment SEG5 in FIG. 3B) or an orientation of the sound. If the scene segment SEG5 is currently broadcasting the sound, the distinct sound source (the scene segment SEG5) is likely to draw users' attention. In this case, the scene segment SEG5 will have a relative higher priority ranking.

Figure 5:
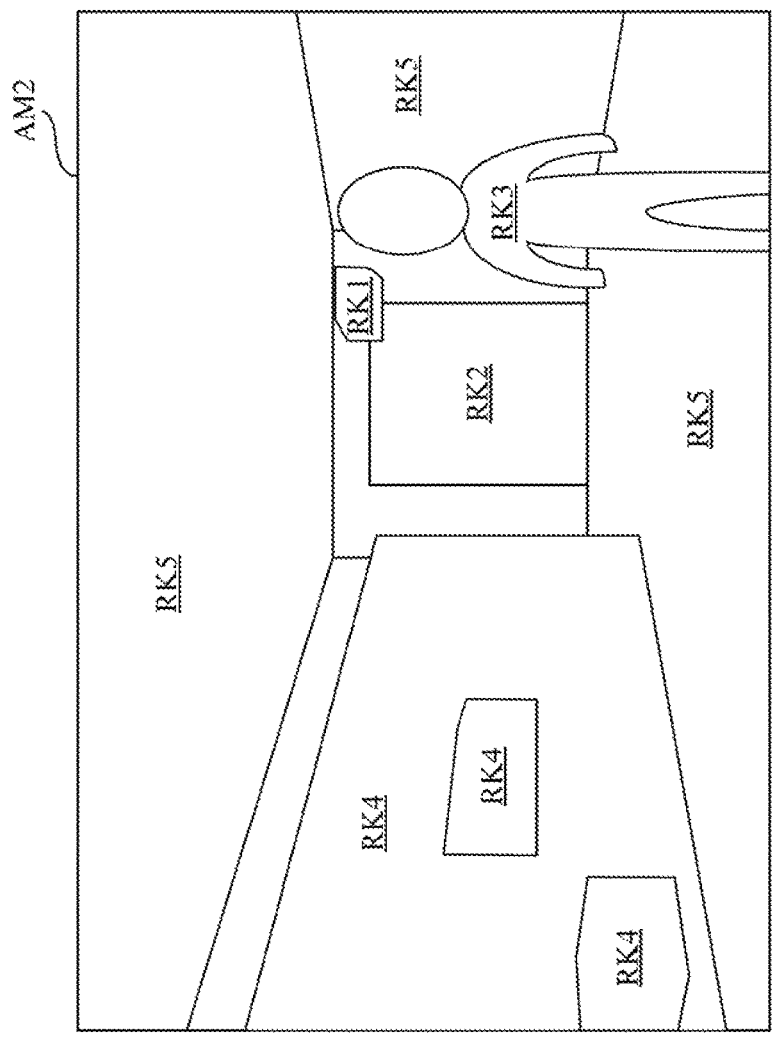
FIG. 5 is another example of an attention map generated from the attention factors.

Reference is also made to FIG. 5, which is another example of an attention map AM2 generated from the attention factors EF1-EF3 and IF1-IF3. In the example shown in FIG. 3B and FIG. 5, the speaker (the scene segment SEG5) is broadcasting a sound, such that a corresponding position in the attention map AM2 is marked as the first priority ranking RK1, which is the highest priority ranking. In this case, the scene segment SEG1 is located adjacent to the scene segment SEG5, such that corresponding positions in the attention map AM2 are marked as the second priority ranking RK2. The scene segment SEG4 is also close to the scene segment SEG5, such that corresponding positions in the attention map AM2 are marked as the third priority ranking RK3. The scene segments SEG2, SEG3 and SEG9 are far from the scene segment SEG5, such that corresponding positions in the attention map AM2 are marked as the fourth priority ranking RK4. The scene segment SEG6 is a background feature far from the scene segment SEG5, such that a corresponding position in the attention map AM2 are marked as the fifth priority ranking RK5, which is the lowest priority ranking.

The attention factors EF3 includes an origin or an orientation of the odor. If the person (the scene segment SEG4) is wearing a perfume, and the fragrance of the perfume is detected, the distinct odor source (the scene segment SEG4) is likely to draw users' attention. In this case, the scene segment SEG4 will have a relative higher priority ranking. In this case, the result of the attention map may be similar to the attention map AM1 shown in FIG. 4.

The attention factor IF1 collected by the view recorder 164 include a location of the visible portion SCNv. The location can be recorded as current coordinates of the visible portion SCNv or a moving pattern of the visible portion SCNv during a period of time. Usually, the scene segment located closer to the center of the visible portion SCNv will have a higher probability to catch user's attention. The attention factors IF1 provides coarser hints about a part of the visible portion SCNv catch user's attention.

The attention factors IF3 include a real object appeared in the front view relative to the user or a camera pose. It is noticed that the head-mounted camera is not suitable to detect a virtual object existed only in the VR/AR scene SCN. Therefore, the attention factors IF3 will not affect the attention map when the electronic apparatus 100 provide a pure virtual reality scene without any real object. The attention factors IF3 recorded by a head-mounted camera 166 in FIG. 1 provides coarser hints about a part of the visible portion SCNv catch user's attention. Usually, the scene segment located closer to the center of the visible portion SCNv in front of the user will have a higher probability to catch user's attention.

The attention factors IF2 include a gaze point (e.g., where the user looking at) or a gaze time period (e.g., how long the user's eye stays at each gaze point) in the eye-gaze pattern. Compared to the attention factors IF1 and IF3, the attention factors IF2 provide finer hints about the part of the visible portion SCNv catch user's attention. When the eye-sight of the user stay at the gaze point for a certain time period (e.g., for 3 seconds), one of the scene segments SEG1-SEG9 corresponding to the gaze point will be regarded to have a higher probability to catch user's attention.

Figure 6:
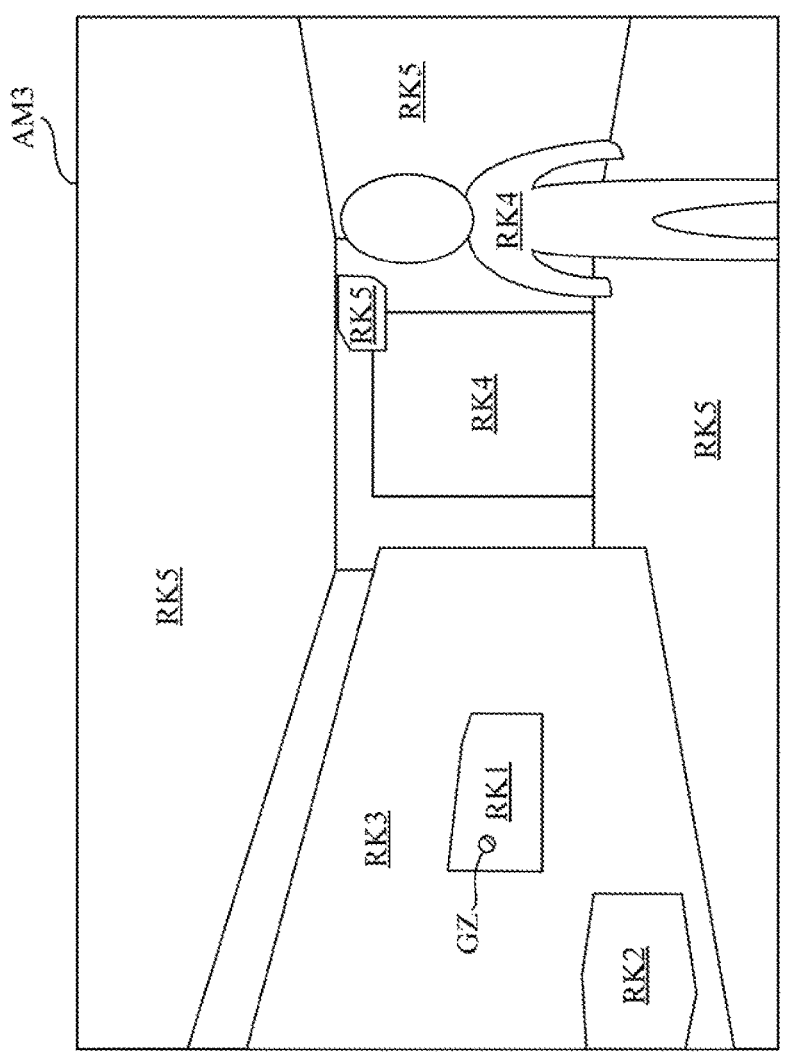
FIG. 6 is another example of an attention map generated from the attention factors.

Reference is also made to FIG. 6, which is another example of an attention map AM3 generated from the attention factors EF1-EF3 and IF1-IF3. In the example shown in FIG. 3B and FIG. 6, the eye-sight of the user stay at the gaze point GZ on the product of the scene segment SEG3 for 3 seconds, such that a corresponding position in the attention map AM3 is marked as the first priority ranking RK1, which is the highest priority ranking. In this case, the scene segment SEG2 is also a product, which is the same kind of object as the scene segment SEG3, such that corresponding positions in the attention map AM3 are marked as the second priority ranking RK2. The scene segment SEG9 is a shelf carrying the products (the segments SEG2 and SEG3) and also close to the scene segment SEG3, such that corresponding position in the attention map AM3 are marked as the third priority ranking RK3. The scene segments SEG1 and SEG4 are far from the scene segment SEG3, such that corresponding positions in the attention map AM3 are marked as the fourth priority ranking RK4. The scene segments SEG6-8 are a background feature far from the scene segment SEG3 and also the scene segment SEG5 is a small object far away, such that a corresponding position in the attention map AM3 are marked as the fifth priority ranking RK5, which is the lowest priority ranking.

Figure 7:
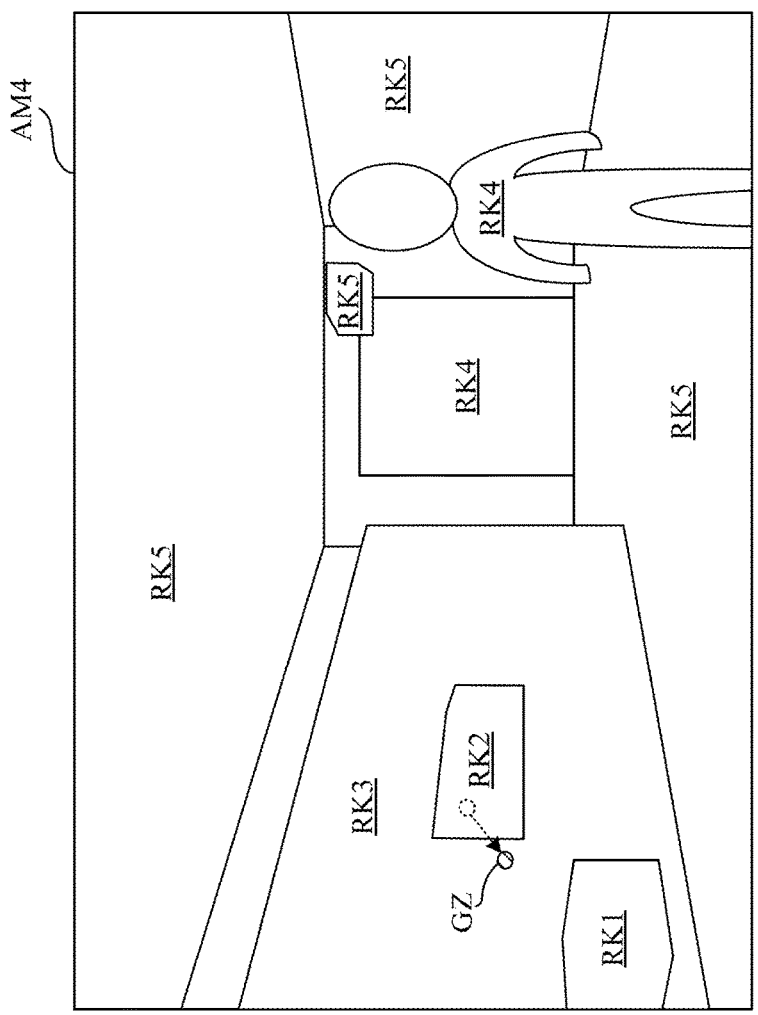
FIG. 7 is another example of an attention map generated from the attention factors.

In aforesaid example shown in FIG. 6, the attention map AM3 is generated according to a current attention distribution based on the location of gaze point GZ. However, the disclosure is not limited thereto. The attention map can indicates a potential attention prediction of user's attention. Reference is further made to FIG. 7, which is another example of an attention map AM4 generated from the attention factors EF1-EF3 and IF1-IF3. In the example shown in FIG. 3B and FIG. 7, the gaze point GZ is previously located on the scene segment SEG3 for a relative short period (e.g., 0.3 second) and the gaze point GZ is now moving in a direction toward to the scene segment SEG2. Therefore, the potential attention prediction can assume that the scene segment SEG2 is going to catch user's attention, such that a corresponding position in the attention map AM4 is marked as the first priority ranking RK1 as shown in FIG. 7. In this case, the attention map AM4 is generated corresponding to a prediction related to the gaze point GZ.

Aforesaid examples shown in FIG. 4, FIG. 5, FIG. 6 and FIG. 7 are utilized to demonstrate some possible cases of the attention maps AM1-AM3. In an embodiment, each attention map is not calculated according to one singular attention factor in the attention factors EF1-EF3 and IF1-IF3. Each attention map is calculated in a weighted sum or a multiplication of the attention factors EF1-EF3 and IF1-IF3.

The actual function used to combine the external factors and internal factors is application dependent. Some external factors (e.g., a fast moving object running into the scene in a sudden) are likely to draw user attention no matter if the user is originally interested in them. In this case, the function combing the external and internal factors could be something like a weighted sum. On the other hand, some external factors are likely to draw user attention only if the user is interested in contents related to them. For example, even if a book has a unique appearance, the user may still pay little attention to it if the user is currently looking for food. In this case, the function combing the external and internal factors could be a multiplication.

As shown in FIG. 1, FIG. 2 and FIG. 3B, after the attention map is generated, operation S206 of the method 200 is performed by the control circuit 180 to allocate a distribution of computational resources of the graphic processing circuit 140 between the scene segments SEG1-SEG9 according to the priority rankings (referring to RK1-RK5 in FIG. 4 to FIG. 6) of the scene segments SEG1-SEG9 in the attention map (referring to AM1-AM3 in FIG. 4 to FIG. 6).

According to the distribution of computational resources, one of the scene segments with a higher priority ranking is computed by the graphic processing circuit 140 at an elevated level in one embodiment. Alternatively, another one of the scene segments with a lower priority ranking is computed by the graphic processing circuit 140 at a degraded level. In an embodiment, the elevated level or the degraded level is related to a texture quality, an amount of sample nodes, a search range or a focus window utilized during rendering, recognizing or reconstructing the scene segments in the virtual reality scene or the augmented reality scene.

For example, one scene segment with a higher priority ranking is rendered by the graphic processing circuit 140 at a higher resolution, recognized with more sample nodes, or reconstructed with a finer scaler in positioning the scene segment. On the other hand, another one scene segment with a lower priority ranking is rendered by the graphic processing circuit 140 at a lower resolution, recognized with fewer sample nodes, or reconstructed with a coarser scaler in positioning the scene segment.

Based on aforesaid distribution of computational resources, the graphic processing circuit 140 may focus more on the scene segment under user's attention. The scene segment out of user's attention can be computed faster in a lower standard (e.g., a lower resolution, a lower sample rate, or a rough positioning) without causing a heavy loading to the graphic processing circuit 140.

As shown in FIG. 1, FIG. 2 and FIG. 3B, operation S208 of the method 200 is performed by the graphic processing circuit 140 to compute the scene segments SEG1-SEG9 differentially according to the distribution of computational resources defined in the attention map (referring to the attention map AM1-AM3 in FIG. 4 to FIG. 6). The displayer 120 can display the virtual reality scene or the augmented reality scene according to the computational result from the graphic processing circuit 140.

Based on aforesaid embodiments, the present disclosure provides an attention-based scheme to identify priority rankings of scene segments (e.g., items, objects, or background features) in an augmented reality (AR) or a virtual reality (VR) world. The priorities derived from the attention-based scheme are utilized to allocate a distribution of computational resources for processing, rendering, recognizing and/or reconstructing aforesaid items, objects, or background features. A scene segment with a higher priority ranking is processed with more computational resources to achieve a better rendering quality and also a shorter latency. On the other hand, a scene segment with a lower priority ranking is processed with fewer computational resources. In this case, a major portion of the limited computing resources can be allocated to the scene segments with higher possibilities to draw user's attention.

Another embodiment of the disclosure is a non-transitory computer readable storage medium with a computer program to execute the method 200 shown in FIG. 2.

The attention-based scheme in this disclosure divides attention according to external and internal factors. The external factors include but not limited to an object saliency, a motion, a sound, and an odor. The internal factors include but not limited to a head movement and an eye-gaze pattern. An attention map is thereby derived at each time instance to prioritize the distribution of computational resources. By analyzing properties of the environment as well as user attention behavior, this attention-based scheme is able to perform optimization techniques to enhance the performance of VR and AR systems.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus, comprising:
    a displayer, configured for displaying a virtual reality scene or an augmented reality scene;
    a graphic processing circuit, coupled to the displayer, the graphic processing circuit being configured for computing a plurality of scene segments in the virtual reality scene or the augmented reality scene;
    a plurality of sensors, configured for collecting a plurality of attention factors;
    a control circuit, coupled to the sensors and the graphic processing circuit, the control circuit being adapted to:
        generate an attention map according to the attention factors, the attention map indicates priority rankings of the scene segments; and
        allocate a distribution of computational resources of the graphic processing circuit between the scene segments according to the priority rankings of the scene segments in the attention map,
    wherein the graphic processing circuit computes the scene segments differentially according to the distribution of computational resources.

2. The electronic apparatus of claim 1, wherein the attention factors comprises an external factor and an internal factor, the external factor is related to a variance of the scene segments in the virtual reality scene or the augmented reality scene, the internal factor is related to a vision, a gesture or a movement of a user of the electronic apparatus.

3. The electronic apparatus of claim 2, wherein the attention map is a current attention distribution or a potential attention prediction, the attention map is generated according to a combination of the external factor and the internal factor.

4. The electronic apparatus of claim 1, wherein the sensors comprises a camera for capturing a motion or an appearance of a real object around the electronic apparatus, the attention factors comprises the motion or the appearance of the real object.

5. The electronic apparatus of claim 1, wherein the sensors comprises a microphone for receiving a sound around the electronic apparatus, the attention factors comprises an origin or an orientation of the sound.

6. The electronic apparatus of claim 1, wherein the sensors comprises a biomimetic smell sensor for sensing an odor around the electronic apparatus, the attention factors comprises an origin or an orientation of the odor.

7. The electronic apparatus of claim 1, wherein the sensors comprises a view recorder configured for recording a streaming view of a visible portion within the virtual reality scene or the augmented reality scene, the attention factors comprises a location of the visible portion.

8. The electronic apparatus of claim 1, wherein the sensors comprises a head-mounted camera for capturing a view in front of a user of the electronic apparatus, the attention factors comprises a real object appeared in the view or a camera pose of the head-mounted camera.

9. The electronic apparatus of claim 1, wherein the sensors comprises an eye-gaze tracker for detecting an eye-gaze pattern of a user of the electronic apparatus, the attention factors comprises a gaze point or a gaze time period in the eye-gaze pattern.

10. The electronic apparatus of claim 1, wherein according to the distribution of computational resources, one of the scene segments with a first priority ranking is computed by the graphic processing circuit at an elevated level or another one of the scene segments with a second priority ranking is computed by the graphic processing circuit at a degraded level, the first priority ranking is higher than the second priority ranking.

11. The electronic apparatus of claim 10, wherein the elevated level or the degraded level is related to a texture quality, an amount of sample nodes, a search range or a focus window utilized during rendering, recognizing or reconstructing the scene segments in the virtual reality scene or the augmented reality scene.

12. A method for displaying a virtual reality scene or an augmented reality scene, the method comprising:
- collecting a plurality of attention factors;
- generating an attention map according to the attention factors, the attention map indicates priority rankings of scene segments in the virtual reality scene or the augmented reality scene;
- allocating a distribution of computational resources between the scene segments according to the priority rankings of the scene segments in the attention map; and
- computing the scene segments differentially according to the distribution of computational resources.

13. The method of claim 12, wherein the attention factors comprises an external factor and an internal factor, the external factor is related to a variance of the scene segments in the virtual reality scene or the augmented reality scene, the internal factor is related to a vision, a gesture or a movement of a user, the attention map is a current attention distribution or a potential attention prediction, the attention map is generated according to a combination of the external factor and internal factor.

14. The method of claim 12, wherein collecting the attention factors comprises:
- capturing a motion or an appearance of a real object by a camera, and the attention factors comprising the motion or the appearance of the real object.

15. The method of claim 12, wherein collecting the attention factors comprises:
- receiving a sound by a microphone, and the attention factors comprising an origin or an orientation of the sound.

16. The method of claim 12, wherein collecting the attention factors comprises:
- sensing an odor by a biomimetic smell sensor, and the attention factors comprising an origin or an orientation of the odor.

17. The method of claim 12, wherein collecting the attention factors comprises:
- recording a streaming view of a visible portion within the virtual reality scene or the augmented reality scene, the attention factors comprising a location of the visible portion.

18. The method of claim 12, wherein collecting the attention factors comprises:
- capturing a view in front of a user by a head-mounted camera, and the attention factors comprising a real object appeared in the view or a camera pose of the head-mounted camera.

19. The method of claim 12, wherein collecting the attention factors comprises:
- detecting an eye-gaze pattern of a user, the attention factors comprising a gaze point or a gaze time period in the eye-gaze pattern.

20. The method of claim 12, wherein computing the scene segments differentially according to the distribution of computational resources comprises:
- computing one of the scene segments with a first priority ranking at an elevated level or computing another one of the scene segments with a second priority ranking at a degraded level, wherein the first priority ranking is higher than the second priority ranking.

21. The method of claim 20, wherein the elevated level or the degraded level is related to a texture quality, an amount of sample nodes, a search range or a focus window utilized during rendering, recognizing or reconstructing the scene segments in the virtual reality scene or the augmented reality scene.

22. A non-transitory computer readable storage medium with a computer program to execute a method, wherein the method comprises:
- collecting a plurality of attention factors;
- generating an attention map according to the attention factors, the attention map indicates priority rankings of scene segments in a virtual reality scene or a augmented reality scene;
- allocating a distribution of computational resources between the scene segments according to the priority rankings of the scene segments in the attention map; and
- computing the scene segments differentially according to the distribution of computational resources.

* * * * *